US010005509B2

(12) United States Patent
Tsai

(10) Patent No.: US 10,005,509 B2
(45) Date of Patent: Jun. 26, 2018

(54) BICYCLE SEAT CUSHION LIFTING AND ADJUSTING DEVICE

(71) Applicant: Taiwan Hodaka Industrial Co., Ltd., Taipei (TW)

(72) Inventor: Black Tsai, Tainan (TW)

(73) Assignee: Taiwan Hodaka Industrial Co., Ltd., Taipei (TW)

( * ) Notice: Subject to any disclaimer, the term of this patent is extended or adjusted under 35 U.S.C. 154(b) by 12 days.

(21) Appl. No.: 15/343,352

(22) Filed: Nov. 4, 2016

(65) Prior Publication Data

US 2018/0127041 A1     May 10, 2018

(51) Int. Cl.
 *B62J 1/08*       (2006.01)
 *B62K 19/36*    (2006.01)

(52) U.S. Cl.
CPC .............. *B62J 1/08* (2013.01); *B62K 19/36* (2013.01); *B62J 2001/085* (2013.01)

(58) Field of Classification Search
CPC ......... B62J 1/06; B62J 1/08; B62J 1/10; B62J 2001/085; B62K 19/36; A47C 3/30
USPC .............................................. 280/274, 281.1
See application file for complete search history.

(56) References Cited

U.S. PATENT DOCUMENTS

| 3,787,019 | A | * | 1/1974 | Freitag | A47B 9/10 |
| | | | | | 188/314 |
| 6,354,557 | B1 | * | 3/2002 | Walsh | B62J 1/08 |
| | | | | | 248/408 |
| 7,025,522 | B2 | * | 4/2006 | Sicz | B62J 1/08 |
| | | | | | 248/188.5 |
| 7,422,224 | B2 | * | 9/2008 | Sicz | B62J 1/06 |
| | | | | | 248/408 |
| 8,328,454 | B2 | * | 12/2012 | McAndrews | B62J 1/08 |
| | | | | | 297/215.13 |
| 8,950,771 | B2 | * | 2/2015 | Felsl | B62K 19/36 |
| | | | | | 280/281.1 |
| 2013/0093231 | A1 | * | 4/2013 | Hsu | B62J 1/08 |
| | | | | | 297/344.19 |
| 2017/0225731 | A1 | * | 8/2017 | Hsu | B62J 1/08 |
| 2017/0240234 | A1 | * | 8/2017 | Tsai | B62J 1/08 |

* cited by examiner

*Primary Examiner* — Tony H Winner
(74) *Attorney, Agent, or Firm* — Alan D. Kamrath; Kamrath IP Lawfirm, P.A.

(57) ABSTRACT

A bicycle seat cushion lifting and adjusting device is disposed on an outer side of a piston rod inside a hydraulic cylinder and sheathed with an elastic member. The elastic member is compressed by an oil inside the cylinder into a compress status in a room temperature environment. In a low temperature environment, the volume of the oil is decreased, and the elastic member resumes its original status to fill up the space of the cylinder caused by the decreased volume of the oil, to maintain a stable oil pressure inside the cylinder. When the seat cushion lifting and adjusting device is used in a low temperature or room temperature environment, the height of the seat cushion can be adjusted successfully to maintain a stable use of the bicycle seat cushion lifting and adjusting device.

4 Claims, 8 Drawing Sheets

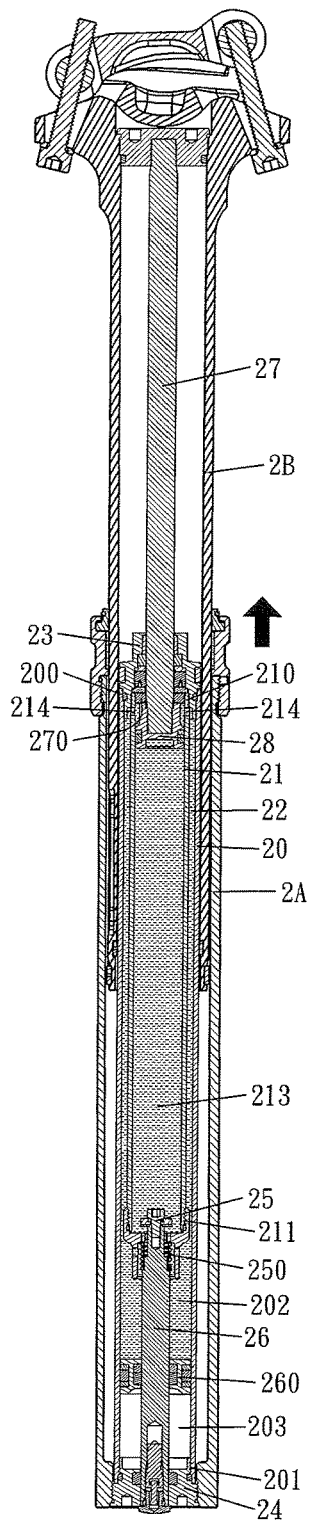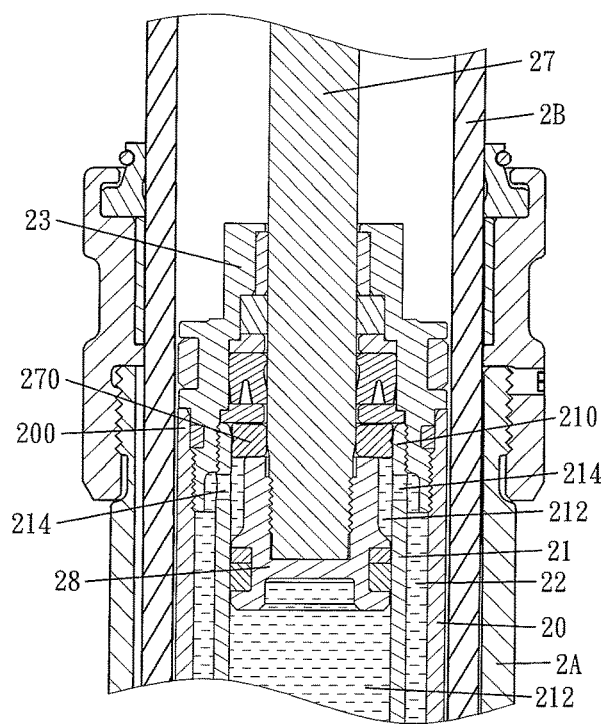
FIG. 7
FIG. 7A

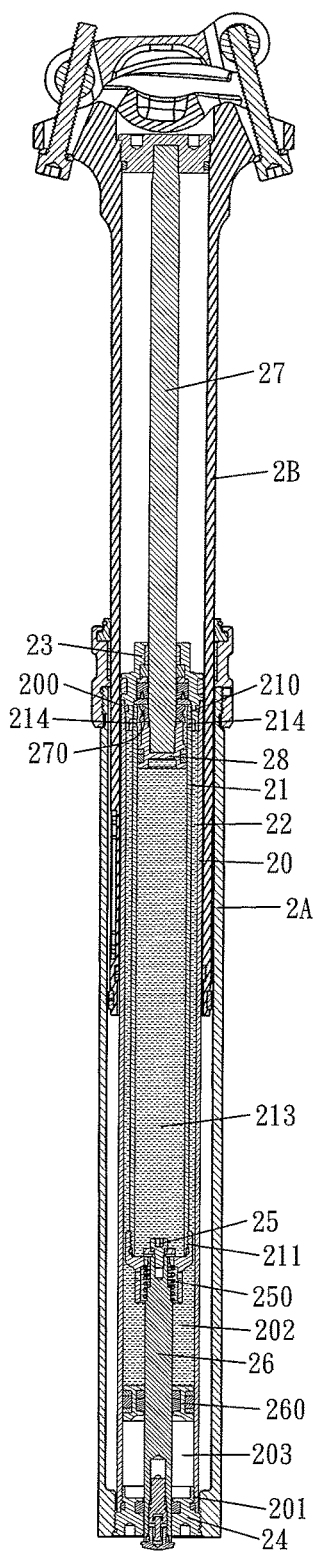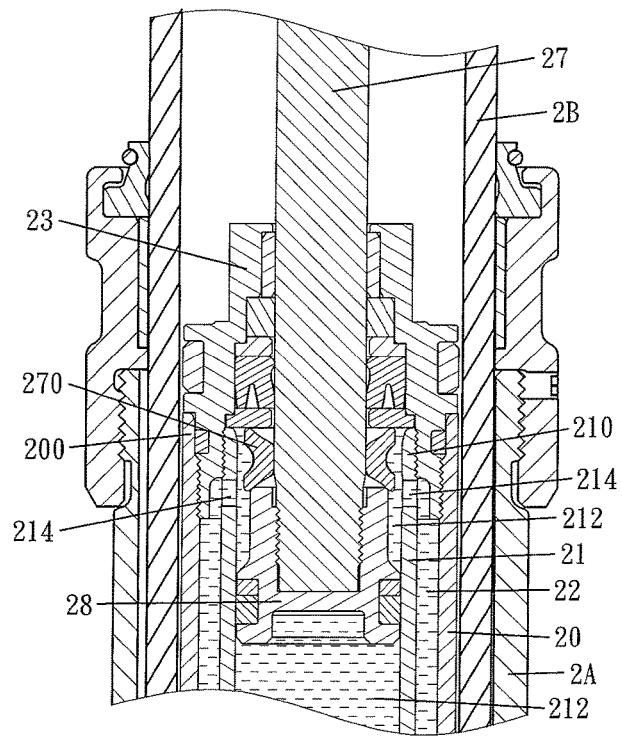
FIG. 8
FIG. 8A

BICYCLE SEAT CUSHION LIFTING AND ADJUSTING DEVICE

BACKGROUND OF THE INVENTION

Field of the Invention

The present invention relates to a bicycle seat cushion lifting and adjusting device and, more particularly, to the bicycle seat cushion lifting and adjusting device capable of overcoming the difficulty of adjusting the height of a seat cushion of a conventional bicycle when the environment is changed from low temperature to room temperature, with the volume of oil inside of the bicycle lifting and adjusting device increased, to maintain the stability of the application.

Description of the Related Art

With reference to FIGS. 1 and 2 for a conventional bicycle seat tube height adjusting mechanism 1, the conventional bicycle seat tube height adjusting mechanism 1 comprises a first tube 10, a second tube 11, a lift adjusting unit 12, and a lift controlling unit 13. The second tube 11 has a bottom end passing into the first tube 10 from a top end of the first tube 10, and the lift adjusting unit 12 is passed and installed inside the first and second tubes 10, 11. The lift controlling unit 13 is provided for controlling the lift adjusting unit 12 to move or stop. The lift adjusting unit 12 has an outer tube 120 and an inner tube 121, and the outer tube 120 is shorter than the inner tube 121. The inner tube 121 is fixed in the outer tube 120, and a gap is formed between the outer and inner tubes 120, 121. The outer and inner tubes 120, 121 have a first nozzle 1200, 1210 and a second nozzle 1201, 1211 disposed at upper and lower ends of the outer and inner tubes 120, 121 respectively. The first and second nozzles 1200, 1201 of the outer tube 120 are sealed by a first plug 123 and a second plug 124 respectively. The first nozzle 1210 of the inner tube 121 has an outer wall coupled to an inner wall of the first nozzle 1200 of the outer tube 120. The second nozzle 1211 of the inner tube 121 contains a valve 12A disposed therein and provided for controlling the inner and outer tubes 121, 120 to be communicated or not to be communicated with each other. The lift adjusting unit 12 has a firing pin 125 extended from the second nozzle 1201 of the outer tube 120 into the second nozzle 1211 of the inner tube 121. The firing pin 125 has a spring 1250, and the spring 1250 has a force constantly pressing and pushing the valve 12A to a closed status. The lift adjusting unit 12 further has a floating piston 126 passed and installed on an outer side of the firing pin 125 and disposed inside the outer tube 120. The floating piston 126 is disposed between the second nozzle 1201 of the outer tube 120 and the second nozzle 1211 of the inner tube 121, and the floating piston 126 is provided for separating the interior of the outer tube 120 into a first oil chamber 1202 and an air chamber 1203. A piston rod 127 is extended from the first nozzle 1200 of the outer tube 120 through the first nozzle 1210 of the inner tube 121 into the inner tube 121. A piston 128 is fixed to an end of the piston rod 127 and disposed in the inner tube 121 for separating the interior of the inner tube 121 into a second oil chamber 1212 disposed at an upper end and a third oil chamber 1213 disposed at a lower end. The inner tube 121 has a plurality of through holes 1214 formed on an inner wall of the inner tube 121 and communicated with the gap 122, and the through hole 1214 is disposed near the first nozzle 1210 of the inner tube 121. With the through hole 1214 and the gap 122, the second oil chamber 1212 and the first oil chamber 1202 are communicated with each other. When the valve 12A is opened by pushing the firing pin 125 by the lift controlling unit 13, oil is communicated with the first, third and second oil chambers 1202, 1212, 1213 and the gap 122. Thus, when the seat cushion is moved upward or downward, the second tube 11, the piston rod 127 and the piston 128 coupled to the seat cushion is moved upward or downward synchronously, while driving the oil to flow through the valve 12A in a forward or reverse direction. When the height of the seat cushion position is adjusted properly, the lift controlling unit 13 is released, so that the valve 12A resumes its closed status, to fix the position of the seat cushion after the adjustment has been made.

When the conventional lift adjusting unit 12 is used in a low temperature environment (such as an outdoor snowy environment), the volume of oil in the first, second and third oil chambers 1202, 1212, 1213 will be decreased due to the drop of temperature. When the valve 12A is opened, the air pressure inside the air chamber 1203 pushes the oil inside the first oil chamber 1202 to pass through the valve 12A to fill up the evacuated space caused by the decreased volume of oil inside the third oil chamber 1213. When the bicycle is run in a room temperature environment (such as an indoor environment), the volume of the oil inside the third oil chamber 1213 will be increased due to the temperature rise, so that the pressure of the third oil chamber 1213 is increased, and the oil inside the third oil chamber 1213 will compress the valve 12A excessively. When a user pushes the lift controlling unit 13, it is difficult for the firing pin 125 to push open the valve 12A, and the height of the bicycle seat cushion cannot be adjusted.

SUMMARY OF THE INVENTION

In view of the aforementioned drawbacks of the prior art, a bicycle cushion lifting and adjusting device in accordance with the present invention was developed to overcome the drawbacks of the prior art.

Therefore, it is a primary objective of the present invention to provide a bicycle seat cushion lifting and adjusting device capable of overcoming the difficulty of adjusting the height of a seat cushion of a conventional bicycle when the environment is changed from low temperature to room temperature, with the volume of oil inside of the bicycle lifting and adjusting device increased, to maintain the stability of the application.

To achieve the aforementioned and other objectives, the present invention discloses a bicycle seat cushion lifting and adjusting device disposed on an outer side of a piston rod inside a hydraulic cylinder and sheathed with an elastic member. The elastic member is compressed by an oil inside the cylinder into a compress status in a room temperature environment. In a low temperature environment, the volume of the oil is decreased, and the elastic member resumes its original status to fill up the space of the cylinder caused by the decreased volume of the oil, to maintain a stable oil pressure inside the cylinder. When the seat cushion lifting and adjusting device is used in a low temperature or room temperature environment, the height of the seat cushion can be adjusted successfully to maintain a stable use of the bicycle seat cushion lifting and adjusting device.

BRIEF DESCRIPTION OF THE DRAWINGS

FIG. 4A is a partial blowup view of FIG. 4;

FIG. 7 is a schematic view of an embodiment of the present invention used in a room temperature environment;

FIG. 7A is a partial blowup view of FIG. 7;

FIG. 8 is a schematic view of an embodiment of the present invention used in a low temperature environment; and FIG. 8A is a partial blowup view of FIG. 8.

DETAILED DESCRIPTION OF THE PREFERRED EMBODIMENTS

The technical characteristics, contents, advantages and effects of the present invention will be apparent with the detailed description of preferred embodiments accompanied with related drawings as follows.

Figure 1:
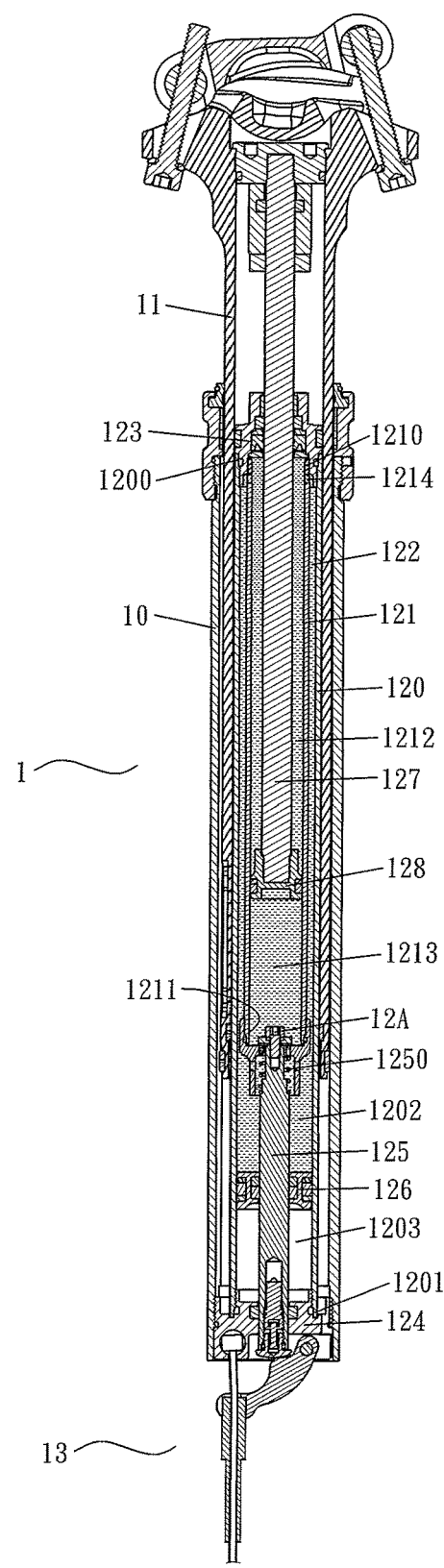
FIG. 1 is a cross-sectional view of a conventional bicycle seat tube height adjusting mechanism.
Figure 2:
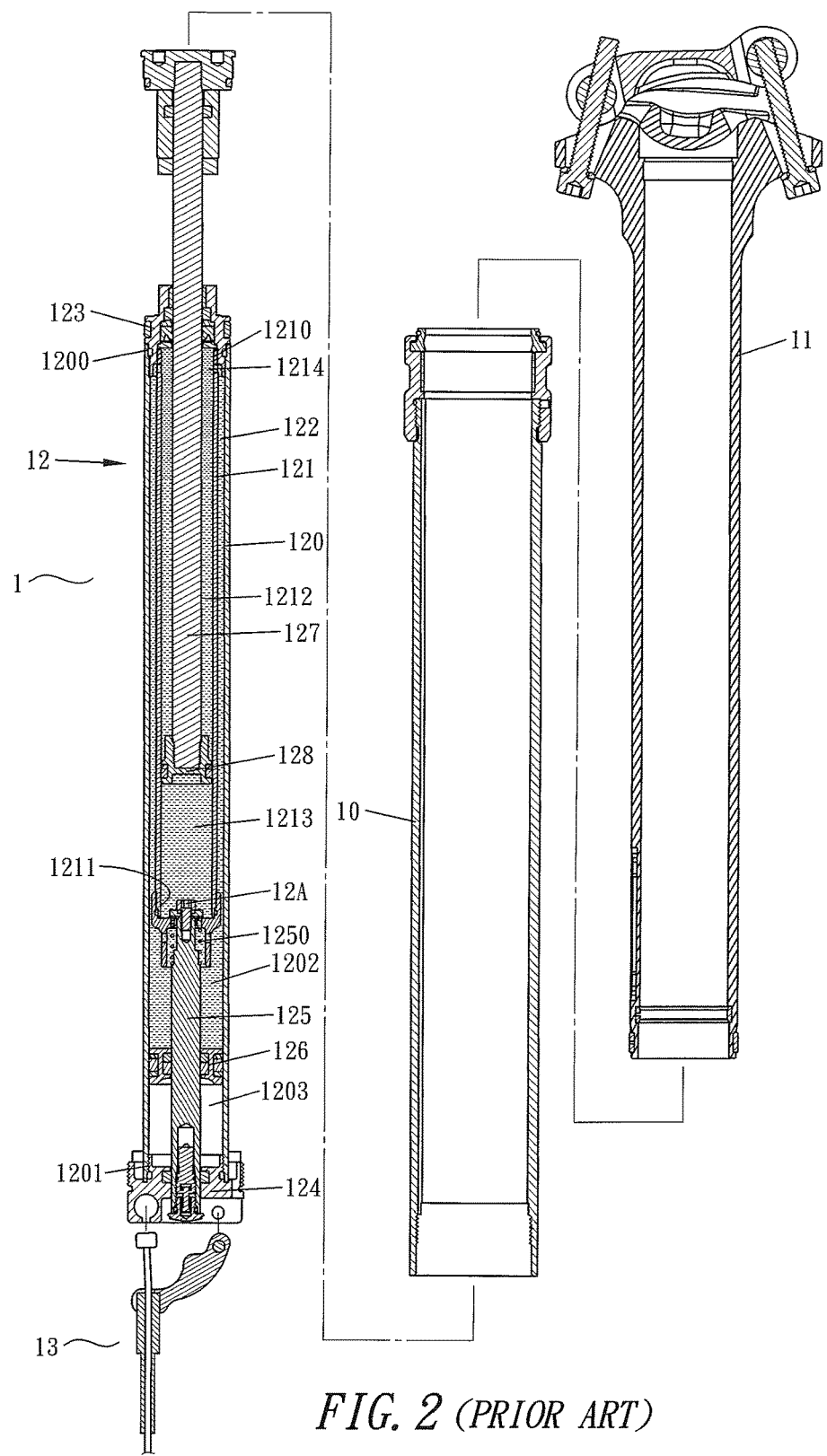
FIG. 2 is an exploded view of a conventional bicycle seat tube height adjusting mechanism.
Figure 3:
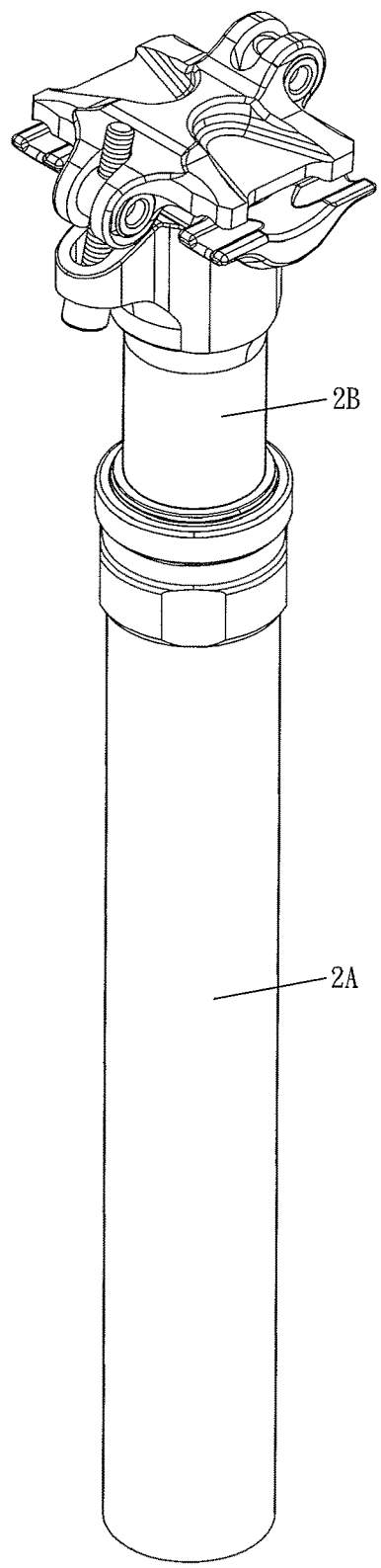
FIG. 3 is a perspective view of an embodiment of the present invention.
Figure 4:
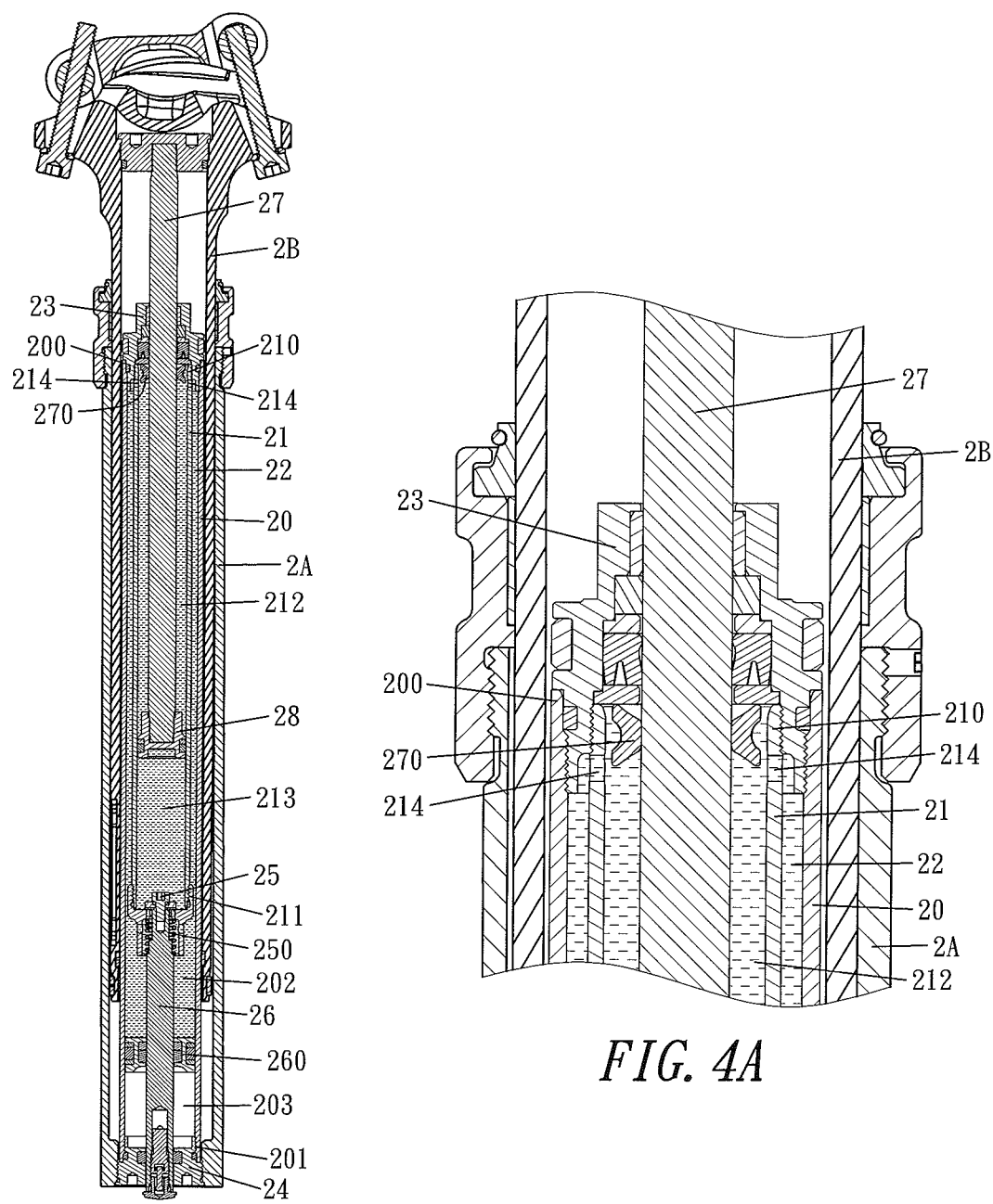
FIG. 4 is a cross-sectional view of an embodiment of the present invention.
Figure 5:
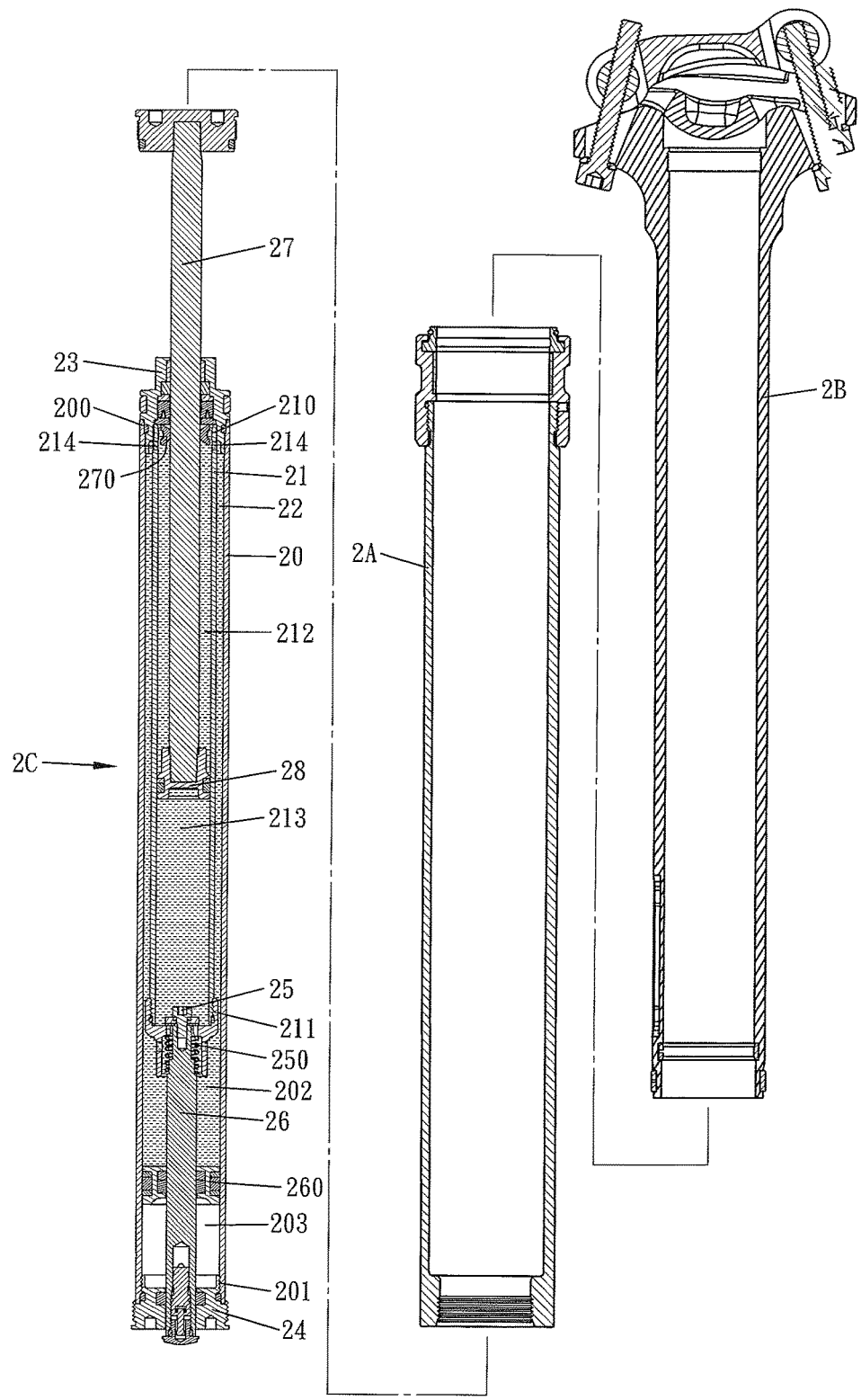
FIG. 5 is an exploded view of an embodiment of the present invention.

With reference to FIGS. 3 to 5 for a bicycle seat cushion lifting and adjusting device 2 of the present invention, the bicycle seat cushion lifting and adjusting device 2 is installed inside a first tube 2A and a second tube 2B after the first and second tubes 2A, 2B are combined. The second tube 2B has a top end fixed to the seat cushion, and the first tube 2A has a bottom end fixed to a bicycle frame. The second tube 2B has a bottom end passed from the top end of the first tube 2A into the first tube 2A. The bicycle seat cushion lifting and adjusting device 2 is a hydraulic cylinder.

A cylinder 2C as shown in FIG. 5 includes an outer tube 20 and an inner tube 21, and the inner tube 21 is shorter than the outer tube 20. The inner tube 21 is fixed inside the outer tube 20, and a gap 22 is formed between the outer tube 20 and the inner tube 21. Both ends of the inner and outer tubes 21, 20 have a first nozzle 210, 200 and a second nozzle 211, 201, and the first and second nozzles 200, 201 of the outer tube 20 are sealed by a first plug 23 and a second plug 24 respectively. The first nozzle 210 of the inner tube 21 is fixed to an inner wall of the outer tube 20. The second nozzle 211 of the inner tube 21 has a valve 25 installed therein and provided for controlling the inner tube 21 and the outer tube 20 to be communicated or not to be communicated with one another. The valve 25 is fixed to a spring 250, and the spring 250 has a force for always pushing the valve 25 to be closed all the time.

A firing pin 26 is controlled to move in an axial direction, and the firing pin 26 is extended from the second nozzle 201 of the outer tube 20 to the second nozzle 211 of the inner tube 21 and fixed to the valve 25. Thus, the firing pin 26 may be pushed to open the valve 25. The firing pin 26 has a floating piston 260 passed and installed on the firing pin 26, and the floating piston 260 is installed inside the outer tube 20 and disposed between the second nozzle 201 of the outer tube 20 and the second nozzle 211 of the inner tube 21. The floating piston 260 separates the interior of the outer tube 20 into a first oil chamber 202 and an air chamber 203, and the first oil chamber 202 and the gap 22 are communicated with each other.

A piston rod 27 is extended from the first nozzle 200 of the outer tube 20 through the first nozzle 210 of the inner tube 21 into the inner tube 21. The piston rod has a piston 28 fixed to an end of the piston rod 27 and disposed inside the inner tube 21, and the interior of the inner tube 21 is separated with respect to the displacement of the piston 28 into a second oil chamber 212 and a third oil chamber 213. The inner tube 21 has a plurality of through holes 214 formed on an inner wall of the inner tube 21, and the through holes 214 are disposed near the first nozzle 210 of the inner tube 21. The through hole 214 is provided for communicating the third oil chamber 213 with the gap 22 and the first oil chamber 202. When the valve 25 is opened, the seat cushion may be adjusted and moved, and the piston rod 27 is moved upward or downward to adjust the seat cushion. The piston 28 can drive the oil inside the cylinder 2C to flow through the valve 25 in a forward or reverse direction for a spatial change. When the valve 25 is blocked, the position of the seat cushion is fixed.

Figure 6A:
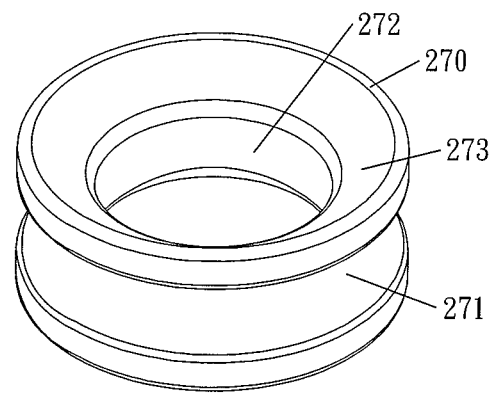
FIG. 6A is a blowup view of an elastic member of an embodiment of the present invention.
Figure 6B:
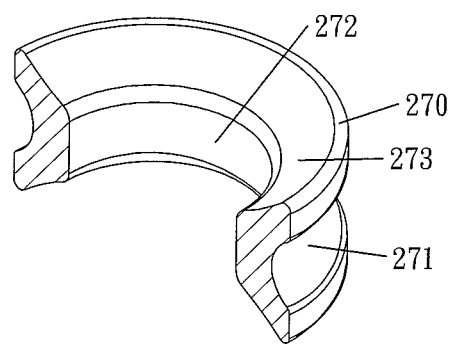
FIG. 6B is a partial cross-sectional view of an elastic member of an embodiment of the present invention.
Figure 6C:
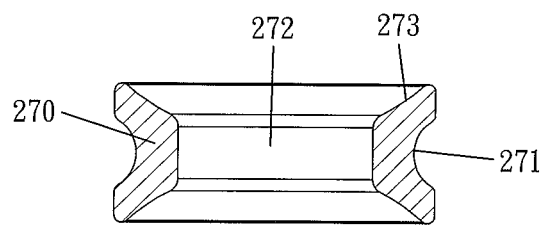
FIG. 6C is a cross-sectional view of an elastic member of an embodiment of the present invention.

An elastic member 270 (as shown in FIGS. 6A, 6B, and 6C) is sheathed on the piston rod 27 (as shown in FIG. 7A) and disposed between the through hole 214 and the first nozzle 210 near the inner tube 21 and cannot block the through hole 214. A circular groove 271 is formed at the middle section of an outer wall of the elastic member 270, so that the elastic member 270 is compressible. A penetrating hole 272 is formed at an axial position and provided for passing the piston rod 27. Both top and bottom sides of the elastic member 270 have a circular ramp 273, so that the elastic member 270 has the compressive elasticity.

When the bicycle is situated in a room temperature environment, the oil inside the cylinder 2C slightly compresses the elastic member 270 as shown in FIGS. 7 and 7A. When the bicycle is situated in a low temperature environment (such as a snowy environment), the volume of the oil inside the cylinder 2C is decreased due to the low temperature, and a space is evacuated from the cylinder 2C due to the decreased volume of the oil, so that the elastic member 270 is no longer compressed and resumes uncompressed status as shown in FIGS. 8 and 8A to fill up the evacuated space of the cylinder 2C. Even when the valve 25 is opened in the low temperature environment, the space inside the cylinder 2C is filled up by the elastic member 270, so that there is no extra oil entering into the third oil chamber 213 or causing a larger pressure when the valve 25 is opened when the bicycle is operated in a room temperature environment. The issue of having difficulty to open the valve 25 for adjusting the seat cushion does not exist.

With the elastic member of the present invention, the evacuated space of the cylinder caused by the decreased volume of oil in a low temperature environment can be filled, so that even when the valve is opened, there will be no extra oil entering into the third oil chamber. The present invention overcomes the drawback of the conventional bicycle that the valve cannot be opened easily when the bicycle is moved to a room temperature environment due to the increased volume of the oil in the third oil chamber and the increased volume and pressure. The present invention has the advantage of maintaining a stable use of the bicycle seat cushion lifting and adjusting device.

What is claimed is:

1. A bicycle seat cushion lifting and adjusting device comprising:

a hydraulic cylinder having a cylinder and a piston rod, with the piston rod having an end disposed outside the cylinder and another end extended into the cylinder and fixed to a piston, with the piston separating an interior of the cylinder into two oil chambers, with the hydraulic cylinder fixed to a seat cushion and to a bicycle frame, with the cylinder having a valve disposed therein and provided for controlling the two oil chambers to be communicated or not to be communicated with one another; and an elastic member installed in the cylinder and sheathed on the piston rod, wherein the elastic member is capable of filling up a vacated space of the cylinder due to a decreased oil volume occurred in a low temperature environment.

2. The bicycle seat cushion lifting and adjusting device of claim 1, wherein the cylinder includes an outer tube and an inner tube, wherein the inner tube is shorter than the outer tube, wherein the inner tube is fixed inside the outer tube, wherein a gap is formed between the inner and outer tubes, wherein both ends of the inner and outer tubes have a first nozzle and a second nozzle respectively, wherein the first and second nozzles of the outer tube are sealed by a first plug and a second plug respectively, wherein the first nozzle of the inner tube has an outer wall fixed to an inner wall of the outer tube, wherein the valve disposed inside the second nozzle of the inner tube and communicated with the interior of the outer tube; wherein a firing pin is extended from outside of the second nozzle of the outer tube into the second nozzle of the inner tube, wherein the firing pin has a spring always pressing and pushing the valve to a closed status; wherein a floating piston is passed and installed on the firing pin and the floating piston is installed inside the outer tube and disposed between the second nozzle of the outer tube and the second nozzle of the inner tube, wherein the floating piston separates an interior of the outer tube into a first oil chamber and an air chamber, wherein the piston rod is extended from the first nozzle of the outer tube through the first nozzle of the inner tube into the inner tube, wherein the piston is disposed inside the inner tube and provided for separating an interior of the inner tube into a second oil chamber and a third oil chamber; wherein the inner tube has a through hole formed on an inner wall of the inner tube, wherein the through hole is near a first outlet end of the inner tube, and wherein the through hole is communicated with the third oil chamber, the gap and the first oil chamber.

3. The bicycle seat cushion lifting and adjusting device of claim 2, wherein the elastic member has a circular groove formed at a middle section of an outer wall of the elastic member and a penetrating hole formed at an axial position of the elastic member and provided for passing the piston rod, and wherein both top and bottom sides of the elastic member have a circular ramp.

4. The bicycle seat cushion lifting and adjusting device of claim 3, wherein the bicycle seat cushion lifting and adjusting device is installed inside a first tube and a second tube after the first and second tubes are assembled, wherein the second tube has a top end fixed to the seat cushion, wherein the first tube has a bottom end fixed to a bicycle frame, wherein the second tube has a bottom end passed into the first tube from the top end of the first tube, and wherein the cylinder is installed in the second tube.

* * * * *